United States Patent
Scott

(10) Patent No.: US 8,708,314 B2
(45) Date of Patent: Apr. 29, 2014

(54) GAMBREL DEVICE

(76) Inventor: Terrance Scott, Elnora (CA)

(*) Notice: Subject to any disclaimer, the term of this patent is extended or adjusted under 35 U.S.C. 154(b) by 104 days.

(21) Appl. No.: 13/163,007

(22) Filed: Jun. 17, 2011

(65) Prior Publication Data

US 2012/0319065 A1 Dec. 20, 2012

(51) Int. Cl.
*B66D 1/00* (2006.01)

(52) U.S. Cl.
USPC .......................... 254/266; 254/334

(58) Field of Classification Search
USPC ............... 254/264–266, 273, 277, 334, 362;
452/152, 160, 185, 187, 188, 189, 190,
452/191; 248/329, 330.1, 331; 119/728
See application file for complete search history.

(56) References Cited

U.S. PATENT DOCUMENTS

| | | | |
|---|---|---|---|
| 4,806,063 A | 2/1989 | York | |
| 5,417,609 A | 5/1995 | Oldham | |
| 5,540,537 A | 7/1996 | Welch | |
| 5,562,534 A * | 10/1996 | McGough | 452/187 |
| 5,588,907 A | 12/1996 | DePietro et al. | |
| 5,591,077 A | 1/1997 | Rowe | |
| 5,820,455 A | 10/1998 | Breedlove | |
| 6,089,431 A | 7/2000 | Heyworth | |
| 6,296,559 B1 | 10/2001 | Kinnebrew | |
| 6,565,426 B2 * | 5/2003 | Mayhew | 452/185 |
| 6,578,722 B2 | 6/2003 | Perkins et al. | |
| 6,695,688 B1 | 2/2004 | Owen et al. | |
| 7,004,830 B2 | 2/2006 | Van der Steen et al. | |
| 7,059,955 B2 * | 6/2006 | Green et al. | 452/189 |
| 7,244,173 B2 | 7/2007 | Lake | |
| 7,314,406 B2 | 1/2008 | Bilinovich | |
| 7,458,563 B1 | 12/2008 | Liu | |
| 2002/0173262 A1 | 11/2002 | Stiefel | |
| 2004/0214515 A1 | 10/2004 | Skarlupka, IV et al. | |
| 2008/0217104 A1 | 9/2008 | Bergeron | |
| 2008/0283334 A1 * | 11/2008 | Fickey et al. | 182/20 |

* cited by examiner

*Primary Examiner* — Emmanuel M Marcelo
*Assistant Examiner* — Angela Caligiuri

(57) ABSTRACT

A gambrel device includes a gambrel frame of a generally tri-angular shaped plate construction of steel or similar strength material that includes a top apex, oppositely disposed base apexes and a substantially flat back surface. A winch is mounted to a front surface of the gambrel frame and includes an electric motor and a winch drum operatively connected to the electric motor for driving the winch drum. A rigging cable extends from the winch drum and is threaded through an eyelet disposed at the top apex of the gambrel frame. The rigging cable may be secured to an existing structure and the winch is operated to hoist and suspend the gambrel frame from the structure. Further, the gambrel device may be utilized as a skid to relocate an animal by dragging the animal across a ground surface.

13 Claims, 5 Drawing Sheets

GAMBREL DEVICE

FIELD OF THE INVENTION

The present invention relates generally to hunting aids including gambrels, game dragging devices and game hoisting devices, and more particularly, relating to portable gambrel device for dragging and hanging an animal from an existing support structure.

BACKGROUND OF THE INVENTION

In hunting it is important to dress an animal as soon as possible to prevent spoiling of the animal before the animal can be further processed. Typically, an animal is suspended from its hind legs with the legs spread to permit better access to the animal. A gambrel is a device that is well known to hunters and is used by hunters to suspend an animal from an existing support in the field for dressing. There exist gambrels of a myriad of constructions for solving various problems encountered when attaching an animal to the gambrel and suspending the animal from the gambrel. However, the basic structure of the gambrel has seen little change over the years. An equal challenge is the hoisting of the gambrel and animal into a suspended position from an overhead support. Accordingly, numerous designs of hoisting devices have been constructed to hoist a gambrel and animal for field dressing.

Further, relocating an animal from an inaccessible location is another challenge often encountered by a hunter. Frequently, an animal must be moved from creek bottoms, step hills, crevasses, thick brush, etc. before it can be field dressed. Accordingly, numerous devices have been developed to aid in dragging or moving an animal in the field.

While the existing devices fulfill their respective objectives and requirements, these devices have disadvantages. For example, existing gambrel designs are used for hanging and not well suited to be dragged across a ground surface. Existing hoisting devices are comprised of bulky and cumbersome constructions. Further, existing hoisting devices require manual labor in operating a winching device to hoist a gambrel and animal. Because of this, suspending large animals in the field can be quite difficult. Moreover, the existing devices are single function featured and require a hunter to carry all three separate devices in the field.

SUMMARY OF THE INVENTION

In view of the foregoing disadvantages inherent in the known types of gambrels, hoisting devices and dragging devices, embodiments of the invention provide a new gambrel construction wherein the same includes a hoisting construction integrated with the gambrel that can be utilized to hoist and suspend game or other objects from an existing support structure, and which can further be used to relocate game.

Embodiments of the present invention also provide a gambrel having an integrated electrically operated hoisting configuration including an electric winch.

Embodiments of the present invention also provide a gambrel having a construction providing a skid surface that is suitable to be dragged across a ground surface for locating an animal for the loading of the animal into a vehicle for transportation or processing.

To achieve these and other advantages, in general, in one aspect, a gambrel device includes a gambrel frame and an electric winch mounted to the gambrel frame and including an electric motor and a winch drum operatively connected to the electric motor. A rigging cable extends from the drum and is threaded through a guide eyelet disposed at top apex of the gambrel frame.

In general, in another aspect, the gambrel frame is comprised of a single plate of material and includes the top apex and oppositely disposed base apexes each of which are angled upwardly towards the top apex and sharpened into a point. The top apex is angled inwardly towards a front side of the gambrel frame and the guide eyelet is formed through the top apex.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Figure 1:
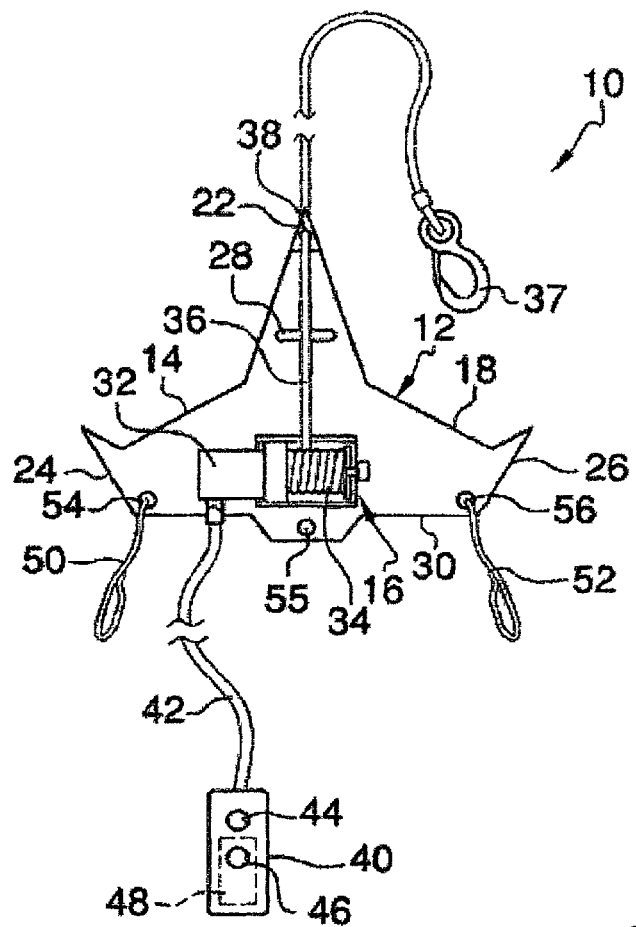
FIG. 1 is a front illustration of a gambrel device constructed in accordance with the principles of the present invention.
Figure 2:
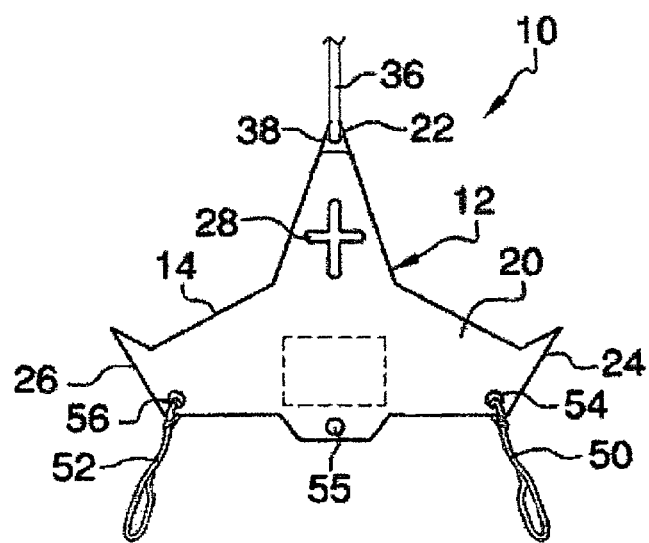
FIG. 2 is a back illustration of the invention.
Figure 3A:
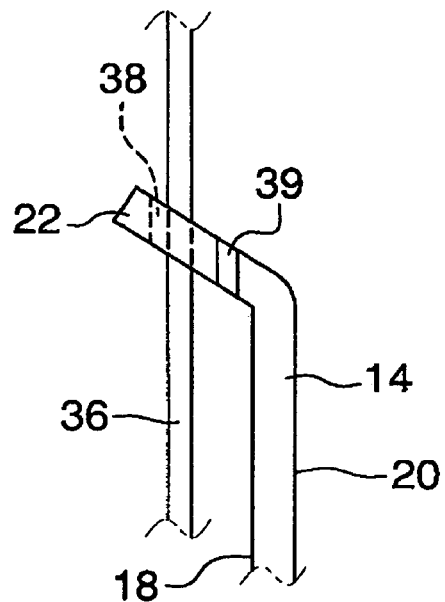
FIG. 3a is an enlarged detailed view of a top portion of the invention.
Figure 3B:
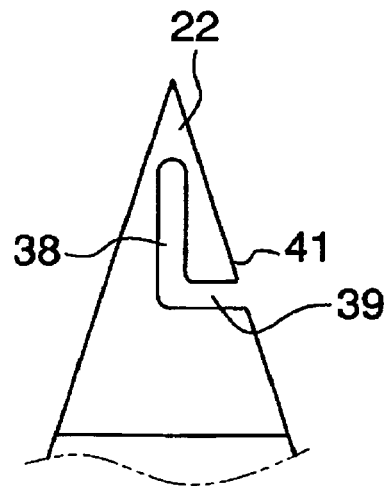
FIG. 3b is an enlarged detailed view of a top portion of the invention.

With reference to FIGS. 1 through 3, there is illustrated a gambrel device 10 in accordance with an embodiment of the invention. Device 10 includes a gambrel 12 having a gambrel frame 14 to which is mounted an electrically powered winch 16. The gambrel frame 14 is comprised of a single plate of steel or similar strong material and has a front side 18 and a back side 20. The gambrel frame 14 is generally triangular-shaped and includes a centrally disposed top apex 22 and oppositely disposed base apexes 24 and 26 each of which are upwardly angled and sharpened to a point. Apexes 24 and 26 provide conventional gambrel hooks or structure utilized to hang an animal for storage and/or processing. The gambrel frame 14 further includes a centrally disposed hook aperture 28 which may be used in suspending or otherwise attaching the device 10 from a support as will be further described hereinafter. Hook aperture 28 may be cross-shaped as illustrated to engage a hook in an upward, downward or side to side engagement as desired during use of device 10.

Winch 16 is mounted to the gambrel frame 14 to be disposed on the front side 18 thereof so at to permit the back side 20 to freely slide across a ground surface when the device 10 is used to drag an animal. Preferably, to lower the center of gravity and to balance the gambrel 12, the winch 16 is mounted to the gambrel frame 14 at a generally intermediate position between apexes 24 and 26 and along a base edge 30 of the gambrel frame. Winch 16 includes an electrical winch motor 32 and a winch drum 34 that is attached to and driven by the winch motor to wind rigging cable 36 thereupon. A hook 37 is attached to the free-end of the rigging cable 36. As best seen in FIG. 3, top apex 22 is angled inwardly with respect to the front side 18 of the gambrel frame 14 and includes a guide eyelet 38 through which the rigging cable 36 is threaded. Rigging cable 36 may be threaded through guide eyelet 38 by passing through slot 39 that connects the guide eyelet to a perimeter edge 41 of the gambrel frame. Guide eyelet 38 guides the rigging cable 36 as it is wound on the winch drum to ensure even winding. Additionally, as will be further described, inward angling of the top apex 22 allows the skidding of the gambrel 12 along a ground surface while preventing the top apex from digging into the ground surface.

As further illustrated in FIG. 1, device 10 includes a winch control, and in the embodiment illustrated here is a wired controller having hand control 40 that is connected to the electric motor 32 of the winch 16 by an electrical cable 42. The electrical cable 42 may be detachably connected to the electric motor 32 through a suitable electrical connector. Hand control 40 includes control buttons 44 and 46 to control the operating direction of the electric motor 32, e.g. depressing button 44 operates the electrical motor to wind the rigging cable 36 onto the winch drum 34 and depressing button 46 operated the electrical motor to unwind the rigging cable from the winch drum. The handle control 40 further includes a source of electrical power 48, such as a battery, for providing electrical power to the electric motor 32 upon depressing either button 44 and 46. Alternative electric power sources may be used, for example, the winch may be connected to the power source of an ATV or other vehicle. The electrical power source may also be in the form of a rechargeable battery that is similar to the battery packs utilized in portable electric power tools.

In an embodiment, device 10 includes a pair of leg cinches 50 and 52 that may used for securing the legs of animal attached to the gambrel 12. Leg cinch 50 is attached to the gambrel frame 14 at a position that is approximate base apex 24 and along base edge 30. Leg cinch 52 is attached to the gambrel frame 14 at a position that is approximate base apex 26 and along base edge 30. In the embodiment illustrated, leg cinch 50 is comprised of a cable that is attached at one end to the gambrel frame 14 by threading through eyelet 54 and includes an adjustable loop at the opposite end. Similarly, leg cinch 52 is comprised of a cable that is attached at one end to the gambrel frame 14 by threading through eyelet 56 and includes an adjustable loop at the opposite end. Cinches 50 and 52 are configured to grasp the narrow portion of the animal's front or back legs, which allows the animal to be hung, dragged, relocated or loaded by the front or back legs. Additionally, a cinch 50 or 52 could be attached to eyelet 55 for securing the head or neck of the animal in lifting, transporting or processing, such as skinning. While cinch 50 and 52 are illustrated, cinches could be replaced by a chain, rope, S-hook or a combination thereof and/or other methods for animal specific application and remain within the scope of the invention.

Figure 4:
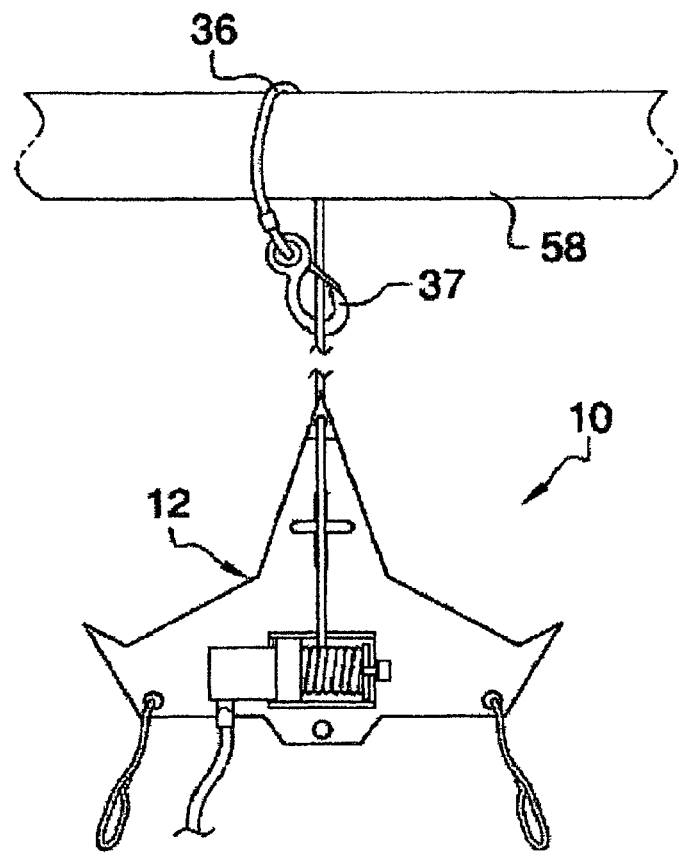
FIG. 4 is a front illustration of the invention attached to a horizontal support structure with a first rigging assembly configured to hoist and suspend an animal.

With reference to FIG. 4, in one aspect, rigging for securing device 10 to a support such as a tree limb 58 includes rigging cable 36 and hook 37. As shown, rigging cable 36 is wrapped around the circumference of the tree limb and secured is by latching hook 37 on the cable forming a loop about the tree limb. Alternatively, the rigging may include a line doubling pulley 60 that may be secured to the support 58 by a cable 62 or other suitable strapping. Rigging cable 36 is threaded through pulley 60 and secured by engaging hook 37 with hook aperture 28, as illustrated. The rigging illustrated in FIGS. 5 and 6 utilizes the mechanical advantaged provided by pulley 60 to lift heavier weights than possible with the rigging illustrated in FIG. 4.

Figure 5:
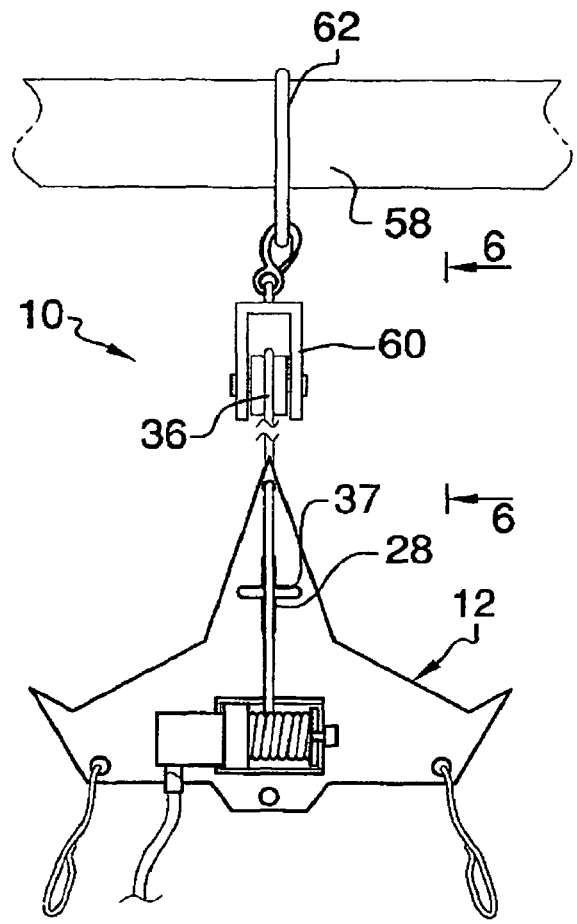
FIG. 5 is a front illustration of the invention attached to a horizontal support structure with a second rigging assembly configured to hoist and suspend an animal.
Figure 6:
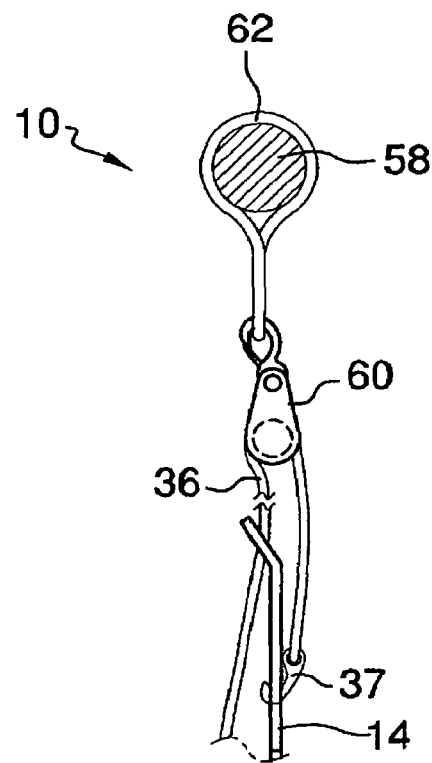
FIG. 6 is a side illustration of the configuration illustrated in FIG. 5.

From the foregoing description of the device 10 the use and advantages thereof may be readily understood. In one aspect, device 10 may be used to suspend an animal (not shown) in the field from a support structure, such as tree limb for field dressing. In this aspect, device 10 is secured to the support 58 as illustrated in FIG. 4 or FIGS. 5 and 6. As discussed above, the animal may be hung from the gambrel 12 for processing and/or storage by inserting base apexes 24 and 26 through opposite legs of the animal. The legs may be secured by cinches 50 and 52 about each respective leg to further secure the animal. Once the animal is secured to the gambrel 12, the animal may be hoisted and suspended from the support 58 by operating the electric winch 16 to wind the rigging cable 36 on the winch drum 34. Once suspended from the support 58 by device 10 the animal may be field dressed.

Figure 7:
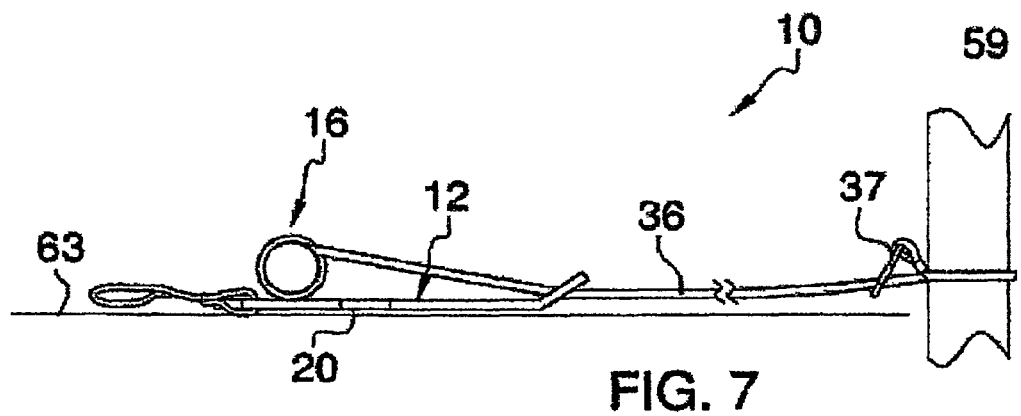
FIG. 7 is a side illustration of the invention attached to a vertical support structure and configured to drag an animal attached to the invention across the ground surface and/or to load into a vehicle for transportation.

Turning to FIG. 7, in another aspect, device 10 may be used to move an animal from a difficult or inaccessible location like a crevasse, creek bottom, steep hill, etc. to a more accessible location or to load the animal into a vehicle, e.g. the bed of a pickup truck. In the first instance, device 10 may be attached a support such as vertical support 59 or any other suitable support by rigging as described above with reference to FIGS. 4 through 6. The winch 16 is then operated to either move the animal or load the animal into a vehicle.

In the first instance, the design of the gambrel 12 permits position of the gambrel on the ground surface 63 with the back side 20 of the gambrel frame 14 in contact with the ground surface. An animal may be secured to the gambrel by it legs by cinches 50 and 52 or alternatively by its head using a cinch secured to central aperture 55. The animal may be dragged across the ground surface by operating the winch 16 as described above. The back side 20 is substantially smooth and therefore is not prone to becoming caught on ground limbs, vegetation, etc. while being dragged across the ground. Additionally, angled apex 22 provides ramp at the forward end of the gambrel 10 that permits the gambrel to raise and lower while tension is on the rigging cable 36 further assisting in avoiding rocks and other objects that might snag the gambrel. The angled apex 22 also assists in sliding the gambrel 10 onto a transport vehicle, e.g. the bed of a pickup truck.

Figure 8:
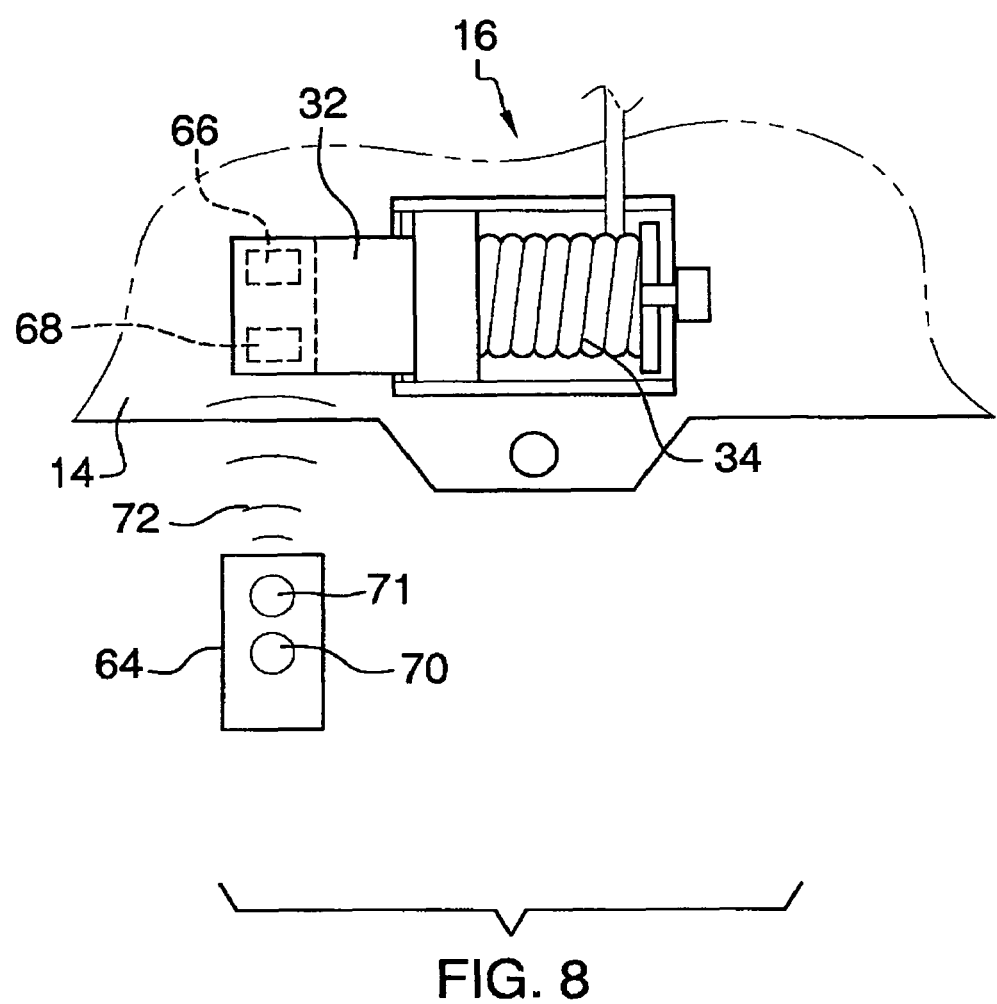
FIG. 8 is a partial illustration of an alternative configuration of the invention.

Turning to FIG. 8, there is illustrated an alternative embodiment of the invention, wherein the winch controller of the device 10 is wireless and includes a wireless controller 64, a power supply 66 and a wireless receiver 68. The wireless controller includes control buttons 70 and 71 similar to the hand held controller 40. The power supply 66 may be carried by the gambrel frame 14 or alternatively may be integrated with the winch 16. The wireless receiver 68 is operatively connected to the power supply 66 and the electric motor 32 of the winch 16. The wireless receiver 68 upon receiving a wireless control signal 72 from the wireless controller 64 operates to control the operating direction of the electric motor 32, e.g. depressing button 70 operates the electrical motor to wind the rigging cable 36 onto the winch drum 34 and depressing button 71 operates the electrical motor to unwind the rigging cable from the winch drum.

The operation and use of the invention hereinabove described is evident to those skilled in the art to which it relates from a consideration of the foregoing. Accordingly, a detailed description of the operation and use of the invention is not required beyond the above description. It should also be apparent from the above description the gambrel 12 may be utilized in removing the hide of an animal. For example, the animal may be secured to the gambrel 12 for lifting with the hide of the animal secured to another suitable structure such that upon lifting of the animal through operation of the winch, the hide of the animal is removed simultaneously as the animal is lifted.

A number of embodiments of the present invention have been described. Nevertheless, it will be understood that various modifications may be made without departing from the spirit and scope of the invention. Accordingly, other embodiments are within the scope of the following claims.

What is claimed is:

1. A gambrel device, comprising:
a gambrel frame having a top apex integrally formed with oppositely disposed base apexes; and
an electric winch mounted directly on said gambrel frame, said winch including an electric motor and a winch drum operatively connected to said electric motor; and
a rigging cable extending from said drum and threaded through a guide eyelet disposed at the top apex of said gambrel frame.

2. The device of claim 1, wherein said gambrel frame is comprised of a single plate of material;
wherein said base apexes are angled upwardly towards said top apex and sharpened into a point;
wherein said top apex is angled inwardly towards a front side of said gambrel frame; and
wherein said guide eyelet is formed through said top apex.

3. The device of claim 2, further comprising:
a pair of leg cinches attached to said gambrel frame.

4. The device of claim 3, wherein one leg cinch is disposed approximate one base apex and along a base edge of said gambrel frame, and the other leg cinch is disposed approximate the other base apex and along said base edge.

5. The device of claim 1, wherein said winch is attached to said gambrel frame at a centrally disposed location and along a base edge of said gambrel frame.

6. The device of claim 1, further comprising:
a hand controller including control buttons, a power supply and an electrical cable, said hand controller operatively connected to said electric motor by said electrical cable.

7. The device of claim 1, further comprising:
a power supply disposed at said gambrel frame;
a wireless controller; and
a wireless receiver operatively connected to said power supply and said electric motor and operating to control said electric motor upon receiving a wireless command signal from said wireless controller.

8. The device of claim 1, wherein said gambrel frame further includes a hook aperture.

9. A gambrel device, comprising:
a gambrel frame comprised of a single plate of material having a generally triangular shape and including a centrally disposed top apex integrally formed with oppositely disposed first and second base apexes, a base edge, a front side and a back side, wherein said top apex is angled towards said front side and includes a guide eyelet, and wherein said first and said second base apexes are upwardly angled towards said top apex and are sharpened into a point;
an electric winch including an electric motor and a winch drum operatively connected to said electric motor to be driven thereby, said electric winch mounted directly on said front side of said gambrel frame and attached thereto at an intermediate position between said first and second base apexes and along said base edge of said gambrel frame;
a rigging cable extending from said winch drum and through said guide eyelet;
a pair of leg cinches attached to said gambrel frame; and
a controller operatively connected to said winch and operable to control said winch.

10. The device of claim 9, wherein said gambrel frame further includes a hook aperture.

11. The device of claim 9, wherein said controller is a wired controller.

12. The device of claim 9, wherein said controller is a wireless controller.

13. The device of claim 9, further comprising a hook attached to a free-end of said rigging cable.

* * * * *